United States Patent Office 3,459,144
Patented Aug. 5, 1969

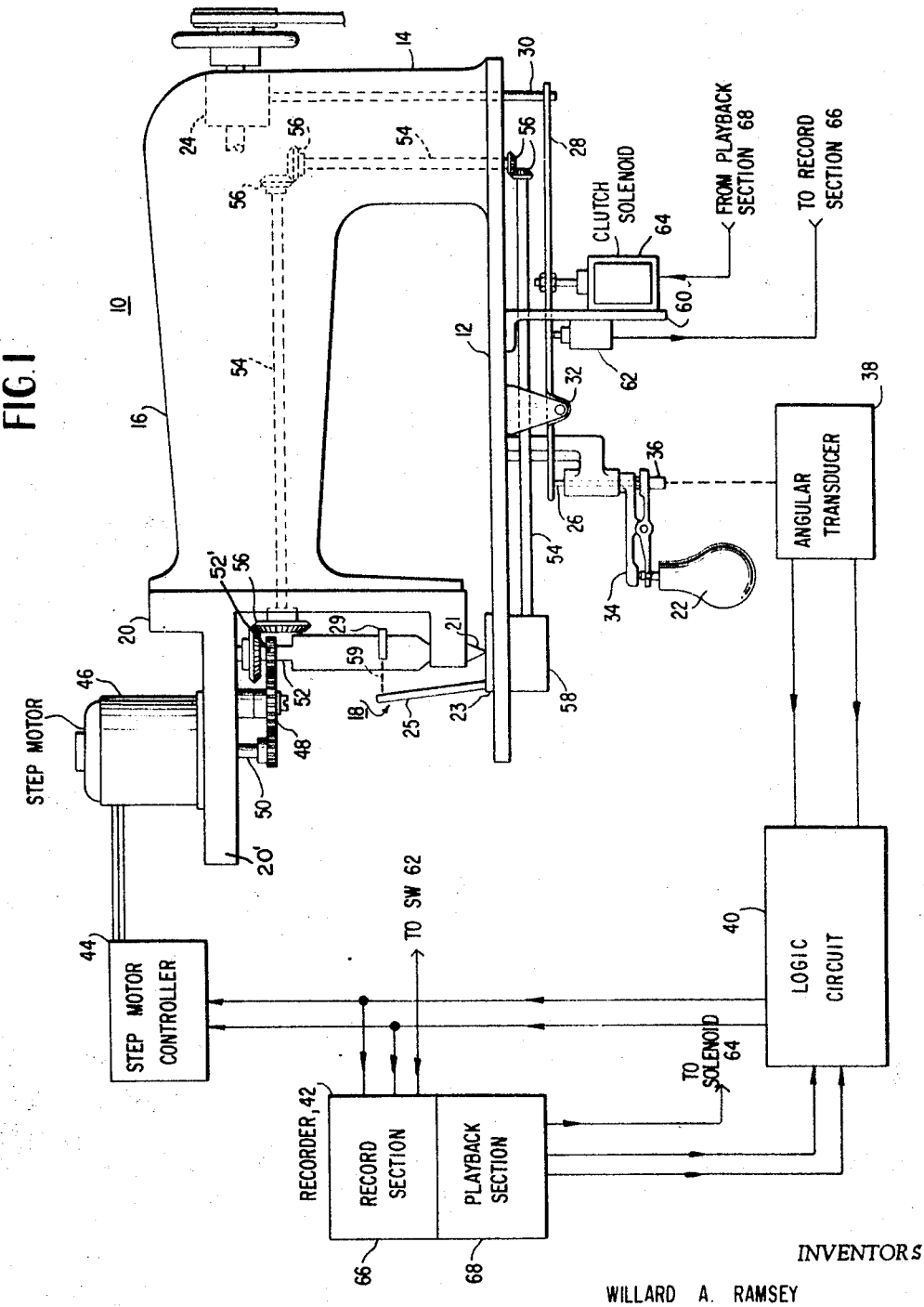

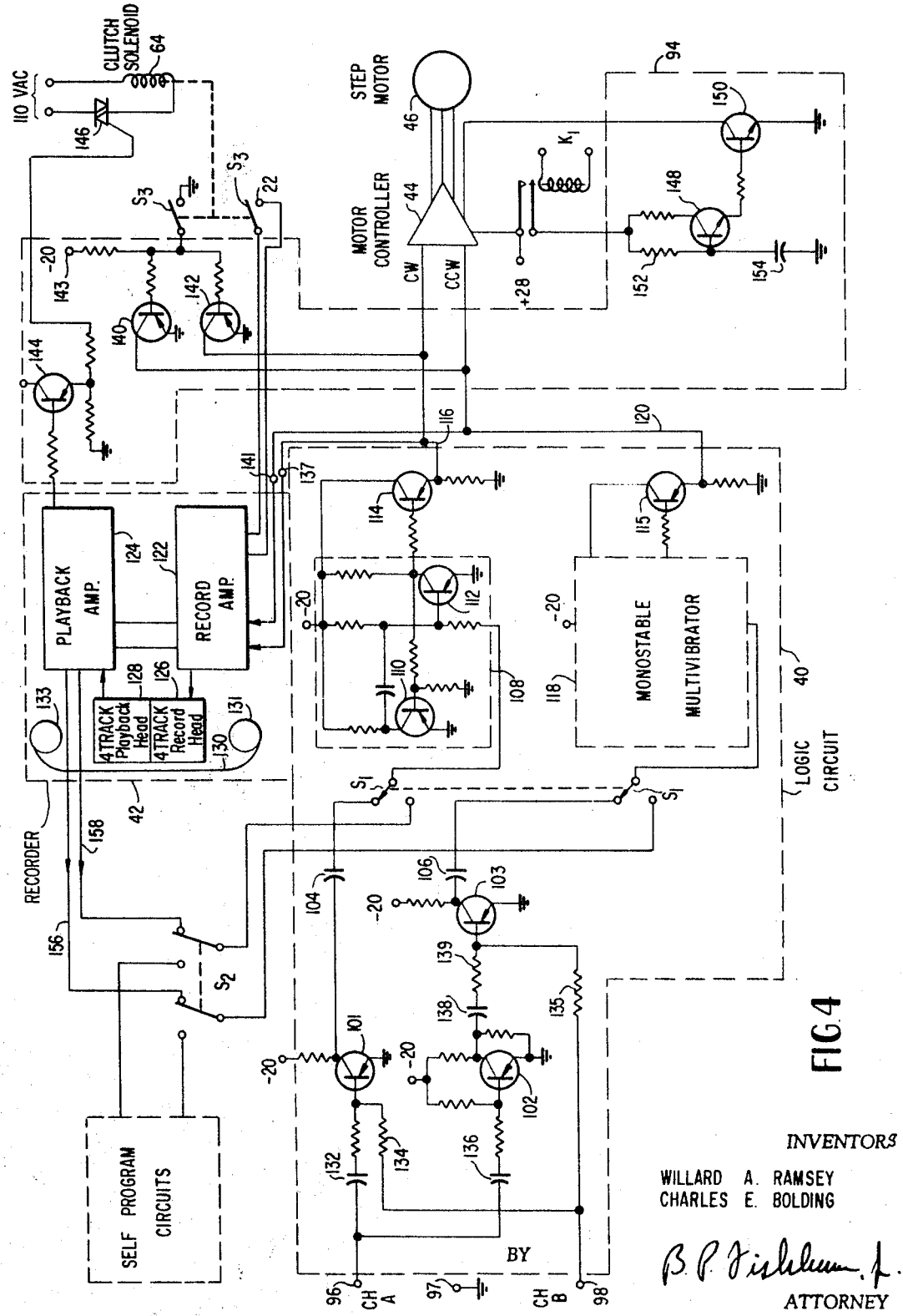

3,459,144
AUTOMATIC EMBROIDERY SYSTEM
Willard A. Ramsey, Greenville, and Charles E. Bolding, Liberty, S.C., assignors to Her Majesty Industries, Inc., Mauldin, S.C., a corporation of South Carolina
Filed Dec. 27, 1966, Ser. No. 605,067
Int. Cl. D05b *23/00;* D05c *3/02, 7/04*
U.S. Cl. 112—121.11          13 Claims

ABSTRACT OF THE DISCLOSURE

A system for recording the motions of a hand crank of a hand-operated embroidery machine as a skilled operator sews a figure and subsequently reproducing this motion on any desired number of similar machines simultaneously with a single unskilled operator in attendance. The recording which may be for example a magnetic tape permits the automatic operation of an embroidery machine for making any abstract figure including writing depending upon the design produced initially by the skilled operator.

BACKGROUND OF THE INVENTION

This invention relates to embroidery sewing machine apparatus of the Cornely type and more particularly to an automated embroidery machine which is under the control of either a magnetic tape or human operator. Sewing machine apparatus of the Cornely type is well known to those skilled in the art. For example, attention is called to U.S. Patent No. 3,139,051, issued to W. G. Story. This patent discloses a universal feed arrangement for a lock stitch sewing machine of the Cornely type. It is also well known to those skilled in the art that sewing apparatus can be automatically controlled by means of a program stored on a perforated tape and the like. Such apparatus are shown and described in U.S. Patent No. 3,029,758, issued to H. J. Hurme et al. and U.S. Patent No. 3,208,414, issued to R. Reeber et al. The above-noted prior art apparatus is inherently inadequate for the purpose of providing an automatic embroidery machine which will require only a single skilled operator to make a master tape recording and thereafter a single unskilled operator may monitor the operation of any desired number of machines automatically operated in accordance with the previously-recorded program.

SUMMARY OF THE INVENTION

Briefly, the subject invention comprises a Cornely type sewing machine apparatus including a hand crank which permits the direction of feeding to be changed in response to the direction in which the hand crank is turned so that a skilled operator is able to produce various decorative embroidery designs at will. For example, any abstract figure including writing can be produced, by the machine, depending upon the artistic skill of the operator. Connected to the hand crank is an angular transducer which is adapted to produce an electrical signal in the form of a pulsed output in accordance with direction and amount of rotation resulting from the operator sewing a predetermined design. The pulsed output is coupled to an electronic logic circuit which generates control signals which may be simultaneously fed to a tape recorder and an electrical step motor which drives the sewing mechanism so as to rotate a workpiece orientation feed guide means and needle plate about the needle axis. For reproducing the design recorded on the tape recorder, it is switched into a playback mode and the information pertaining to the recorded design is fed back through the logic circuit and thence to the step motor for exactly reproducing step-by-step the design. Once a particular design has been recorded, the same or any other number of similar type machines can be simultaneously operated to reproduce the recorded design while obviating the need for the continuous operation by a highly skilled operator.

Other attendant advantages of the subject invention will become apparent when the following detailed description is read in conjunction with the accompanying drawings.

BRIEF DESCRIPTION OF THE DRAWINGS

FIGURE 1 is a fragmentary front elevational view of a sewing machine embodying the subject invention in addition to a block diagrammatic representation of the electrical circuitry included to control the sewing machine;

FIGURE 4 is a schematic diagram of the electrical circuitry shown block diagrammatically in FIGURE 1.

DESCRIPTION OF THE PREFERRED EMBODIMENT

Figure 3:
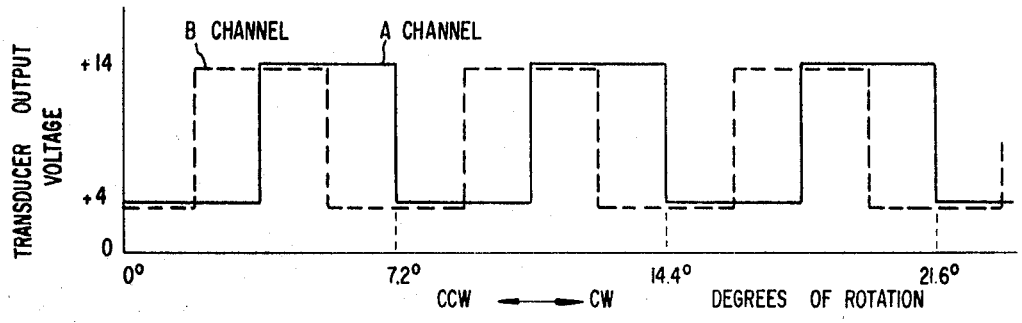
FIGURE 3 is an illustrative diagram of the pulsed output signals produced by the angular transducer shown in FIGURE 2.

Referring to the drawings in detail and more particularly to FIGURE 1, there is shown rather diagrammatically a Cornely-type embroidery sewing machine 10, substantially identical to the machine in the above-mentioned Story Patent 3,139,051. The sewing machine 10 includes a base or table 12, vertical standard 14, horizontal arm 16 and head 20. A workpiece or cloth orientation and feed means is shown diagrammatically at 18, and this feed means is fully shown and described in the mentioned Story patent.

In FIGURE 1, the vertical shaft 52 corresponds to the control shaft 122 in the Story patent which is rotated through bevel gear 130 in that patent when the crank-handle 56 is turned. In FIGURE 1, a gear 52' on the shaft 52 corresponds exactly to the gear 130 of Story and is driven through gearing 48 from output shaft 50 of step motor 46, mounted upon an extension 20' of sewing machine head 20. As will be fully described, rotation of the hand crank 22 in FIGURE 1 turns shaft 36 and drives angular transducer 38 with which the shaft 36 is coupled. The angular transducer 38 generates a pair of pulsed output signals which have a phase relationship which is a function of rotation of the shaft 36. The pulsed output from the angular transducer 38 is feed to a logic circuit 40 and the logic circuit in turn is electrically coupled to recorder means 42, which may be, for example, a four track tape recorder and an electrical step motor controller 44. The step motor 44 is connected to the electrical step motor 46. This step motor is adapted to rotate in discrete steps in either a clockwise or counterclockwise direction, depending upon the control signals received from the step motor controller 44. This motion is transmitted through step motor shaft 50 and gearing 48 to the gear 52' of rotary shaft 52. The only distinction from the mechanism of the Story patent is that, in the patent, the rotary shaft 122 of the feed means derives its rotation from the gear 30 when the crank handle 156 is manually turned, rather than from the operation of the step motor and associated circuitry in the present invention.

The remainder of the cloth orientation and feed means 18, shown diagrammatically in FIGURE 1, may be constructed and may operate in exactly the manner disclosed in the Story patent and the details of construction of this feed mechanism has been omitted in FIGURE 1 for simplicity of illustration and further because the entire Story conventional mechanism is intended to be incorporated herein by reference.

As in the Story patent, the reciprocating needle bar 21 is disposed coaxially within an annular or ring type presser or feed foot 23 carried by the lower end of an arm or feed bar 25 which corresponds exactly to the feed bar 72 of Story as shown in FIGURE 3 of that patent. The mechanism which causes the feed or presser foot 23 to rise and fall and to oscillate laterally for feeding the cloth over the table surface 12 in a step-by-step manner and in any given direction determined by rotation of the gear 52' is identical with the mechanism disclosed in the Story patent, particularly in FIGURES 3, 4 and 5. Elements of the Story mechanism are schematically indicated at 29 and 59 in FIGURE 1 but the actual physical construction of parts corresponds to the Story patent. Therefore, in essence, the invention simply utilized the sewing machine of the Story patent but instead of powering the gear 130 of Story manually to establish the direction of feed of the work, the corresponding gear 52 in the invention is powered through the step motor 46 and related control circuitry which may be thought of as an attachment kit applicable to any Cornely-type sewing machine with very little modification of the machine structure.

Continuing to refer to FIGURE 1, the hand crank 22 beneath the base or table 12 is adapted to cause engagement of a clutch 24 when pulled downwardly manually. This motion activates the clutch 24 through a reciprocating rod 26, a pivoted arm or rod 28, and a vertically shiftable rod 30. The arm 28 is pivoted between its ends at 32 to a bracket depending from the table 12. As previously stated, the hand crank 22 through its crank arm 34 is coupled to rotary shaft 36 so as to turn the same and operate transducer means 38.

Simultaneously with the reciprocation of the needle bar 21 and operation of the feed means 18 as described, additional gearing 56 is powered by the step motor 46 through gear 52' and shaft 52 and such additional gearing causes shafts 54 to rotate in unison for driving the usual bobbin mechanism 58 shown diagrammatically in FIGURE 1, corresponding to the bobbin mechanism 42 in the Story patent, powered through similar shafts and gearing from the mentioned gear 130 in Story.

Referring back to the mechanism associated with the hand crank 22, a bracket 60 is suspended from the lower side of the base 12 and a limit switch 62 is mounted on one side thereof while an electrical solenoid 64 is mounted on the opposite side. The switch 62 is activated by means of the pivot arm 28. The solenoid 64 is used for the purpose of energizing the clutch 24 without the help of an operator in the automatic mode of operation hereinafter described more fully, but is also energized when the hand crank 22 is pulled down manually.

Briefly, the operation of the subject invention as disclosed in FIGURE 1 proceeds as follows:

In the first mode of operation, which might be termed the "record" mode, an operator skilled in the art of embroidering with a Cornely type sewing machine starts the sewing machine 10 by means of pulling down on the hand crank 22, which motion engages the clutch 24 through the push rod 26, the pivot arm 28 and the pull rod 30. The angular motion imparted to the shaft 36 produces a pulsed output from the angular transducer 38 wherein the logic circuit then feeds first and second control signals to the recorder 42 and the step-motor controller 44. The step-motor controller 44 drives the step-motor 46 in either a clockwise or counterclockwise direction depending upon the motion imparted to the hand crank 22. As previously explained in connection with the Story patent mechanism, this will establish the direction of feed of the work or cloth through the rotation of the feeding presser foot 23 which surrounds the reciprocating needle.

The recorder 42 is adapted to include a record section 66 and a playback section 68. These sections are shown for the purposes of illustration as comprising a single recording means 42; however, it should be pointed out that, when desirable, the record and playback sections 66 and 68 as illustrated may be separate and distinct equipment. The output of the angular transducer 38 is coupled to the record section 66 through the logic circuit 40 such that the motion produced by the operator is recorded on a recording medium such as a tape. In addition, a signal is also recorded on the tape when the switch 62 is activated by means of the tilt bar 28. This signal is termed a cue signal. The cue signal is in the nature of 150 cycle signal produced by an oscillator, not shown, which is activated when the switch 62 is closed. The purpose of the cue signal, when recorded, will activate the clutch solenoid 64 when the tape is played back in the playback section 68 in a second mode of operation, which might be termed the "reproduce" mode.

A fourth signal is also placed on the recording medium in the record section 66 and it is a signal for stopping the recording medium which, in the present example is a tape, at the end of one complete pass. This signal is generated internally of the record section 66 and is not shown. Therefore, as the operator goes through an embroidering procedure, sufficient information is recorded on the recording medium in a plurality of tracks and, in the instant invention four tracks, such that when the playback section 68 is switched into operation, the information recorded on the tape is played back to initially engage the solenoid 62, thereby activating the sewing machine 10 and the prerecorded information of the operator's motion is coupled to the step motor controller through the logic circuit 40 for repeating automatically the clockwise and counterclockwise movements of the step motor 46 and thereby automatically reproduce the embroidery design. Once the design has been recorded, it can be reproduced any number of times either on a single machine or a plurality of machines in volume quantities under the operation of a now relatively unskilled operator.

Figure 2:
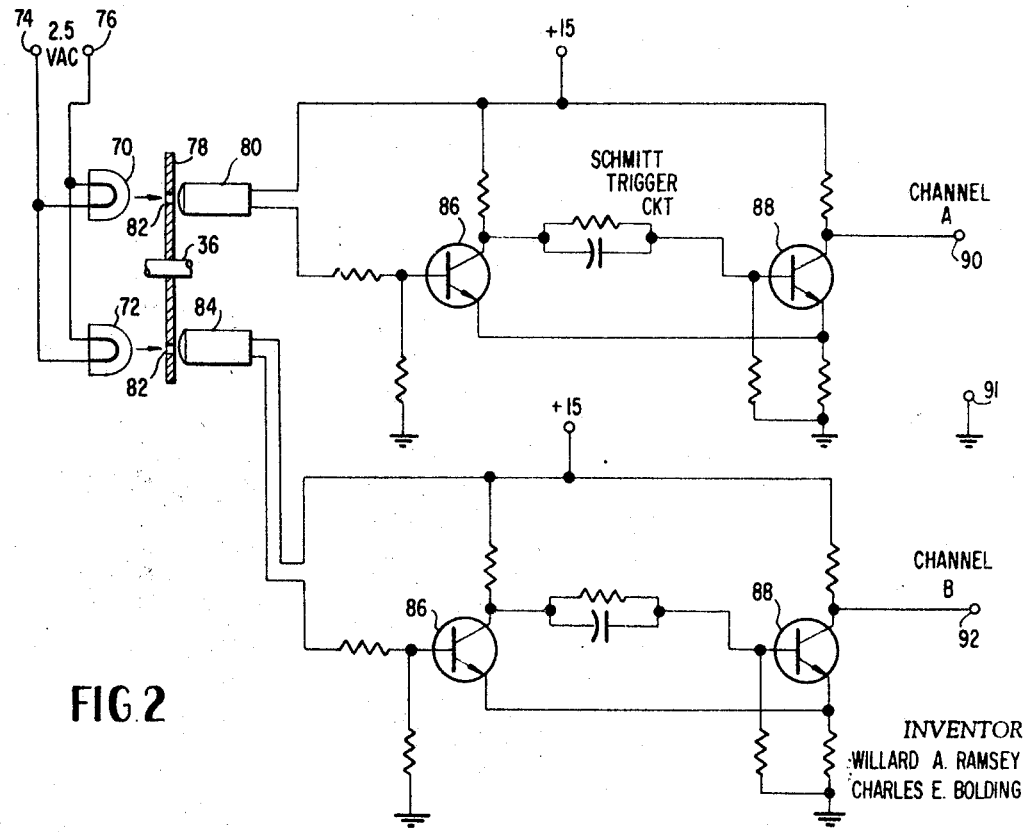
FIGURE 2 is an electrical schematic diagram of the angular transducer forming part of the block diagram shown in FIGURE 1.

Considering the present invention now in greater detail, attention is directed to FIGURE 2 which is a schematic diagram of the angular transducer shown in FIGURE 1. There is shown a pair of electric lamps 70 and 72 coupled together in parallel across a pair of terminals 74 and 76 which are coupled to a source of electricity, not shown. These lamps, when energized, pass light through a perforated disc 78 connected to the shaft 36. A photocell 80 is positioned on one side of the disc 78 so that it is responsive to light emitted from the electric lamp 70 when an aperture 82 appears in the disc. A second photocell 84 is also located so that it is responsive to light emitted from the lamp 72. The angular transducer produces a two channel output identified as channels A and B and photocell 80 produces a signal for channel A while the photocell 84 produces a signal for channel B.

The disc 78 is adapted to have a plurality of apertures 82 such that for each revolution of the disc the photocells 80 and 84 will be illuminated fifty times or once every 7.2°. The photocells 80 and 84, moreover, are positioned with respect to the apertures 82 such that a 90° electrical phase shift exists between the outputs of the photocells. The output of each of the photocells 80 and 84 are coupled into a respective Schmitt trigger circuit comprised of transistors 86 and 88 which are coupled together as shown and are biased from a collector bias supply voltage of +15 volts DC from a source not shown. The Schmitt trigger circuit produces a waveform with a fast rise time and fall time regardless of the rotational speed of the transducer shaft 36. Moreover, the waveform produced is a squarewave. The squarewave output from channel A is taken from terminal 90 whereas the square wave output from channel B is taken from terminal 92.

FIGURE 3 is a diagram of waveforms illustrating the waveforms for channels A and B appearing at terminals 90 and 92, respectively. The collector voltage of transistor 88 varies between +4 to +14 volts when it is respectively conducting and non-conducting. FIGURE 3, then, discloses a squarewave for channels A and B alternately having values of +4 to +14 volts with each full cycle thereof being 7.2° of shaft rotation. Also indicated is the fact that for a clockwise (CW) rotation, channel A lags channel B by 90 electrical degrees. However, for a counterclockwise (CCW) rotation, channel B will lag channel A by 90 electrical degrees.

Referring now to FIGURE 4, there is shown a schematic diagram of the control circuitry utilized in the subject invention. Shown in greater detail is the logic circuit 40, the recorder 42, a switching circuit 94 which will be described more fully subsequently, the motor controller 44 and the step motor 46.

Considering the logic circuit 40, there is shown input terminals 96, 97 and 98. These terminals are coupled, respectively, to the output terminals 90, 91 and 92 of the angular transducer illustrated in FIGURE 2. Terminal 96 which receives the channel A signal is capacitively coupled to the base of transistors 101 and 102 by means of capacitors 132 and 136, respectively. Terminal 98 which corresponds to the channel B input is resistively coupled to the base of transistors 101 and 103 by means of resistors 134 and 135, respectively. The collector of transistor 102 is capacitively coupled to the base of transistor 103 by means of capacitor 138 and resistor 139. The collector of transistor 101 is connected to one section of a double-pole, double-throw switch $S_1$ by means of the capacitor 104 while the collector of transistor 103 is coupled to the other section of switch $S_1$ by means of the capacitor 106. The switch $S_1$ is illustrated in the record mode of operation where the operator manually sews a pattern on the sewing mechanism 10. The other position of switch $S_1$ is for the purpose of switching the apparatus to the reproduce mode.

The armature of the first section of switch $S_1$ feeds into a first monostable multivibrator 108 which is comprised of transistors 110 and 112. The output of the monostable multivibrator 108 is fed to a buffer amplifier comprising transistor 114 and the output therefrom is applied to circuit lead 116 which is connected to the emitter terminal of transistor 114. With respect to channel B, the wiper of the second section of switch $S_1$ is coupled to a second monostable multivibrator 118 which is identical to the circuitry shown with respect to the multivibrator 108. The output of the monostable multivibrator 118 is applied to the buffer amplifier comprising transistor 115 where it is then coupled to circuit lead 20.

The recorder 42 is shown comprising a four-track tape recorder comprising both record and playback apparatus including a record amplifier 122, a playback amplifier 124, a four-track record head 126, a four-track playback head 128 and a tape 130 shown mounted between two reels 131 and 133 over the heads 126 and 128.

Considering the operation of the circuitry shown in FIGURE 4, the function of transistors 101, 102 and 103 is to take the output squarewaves from channels A and B appearing at terminals 90 and 92, respectively, of the angular transducer shown in FIGURE 2 and illustrated in FIGURE 3, and provide one positive going pulse at the $S_1$ switch terminal connected to capacitor 104 each time the transducer shaft 36 is rotated past one of the 7.2° increments in the clockwise (CW) direction while providing one positive going pulse at the $S_1$ switch terminal connected to the capacitor 106 each time the transducer shaft 36 is rotated past one of the 7.2° increments in the counterclockwise (CCW) direction. When a pulse appears at capacitor 104, it is fed to the monostable multivibrator 108 which in turn generates a 50 microsecond ($\mu$sec.) negative squarewave pulse. This 50 $\mu$sec. pulse is then coupled to the buffer amplifier stage comprising transistor 114 and then to one input terminal 137 of the recorder 42 which is the channel A input for the record amplifier 122. Also, the 50 $\mu$sec. pulse is simultaneously coupled to the CW input to the motor controller 44 which will step the step motor 46 one step in the clockwise direction. When there is a pulse appearing at capacitor 106, it is coupled to the monostable multivibrator 118 and thence to the buffer amplifier comprising transistor 115. The output pulse appearing at circuit lead 120 is then simultaneously coupled to the channel B input terminal 141 of the recorder 42 and the CCW input to the motor controller 44. This in turn will step the motor 46 one step in the counterclockwise direction.

The purpose of transistors 101, 102 and 103 is for detecting the difference between the clockwise (CW) and counterclockwise (CCW) rotation of the transducer shaft 26 (FIGURES 1 and 2) and produce a positive pulse at either capacitor 104 or 106 accordingly. For example, consider the transducer shaft 36 to be at 0° and rotating in a clockwise direction. At the time it passes 7.2°, the B channel will have a value of +4 volts at terminal 92 while the A channel will switch from +14 volts to +4 volts at terminal 90. This will produce a 10 volt negative pulse at the capacitor 132. Since the base of transistor 101 is at +4 volts due to resistor 134 being connected to terminal 98, it is "off" or non-conducting; however, when the negative 10 volt pulse is applied to the base of transistor 101, it is turned "on" or rendered conductive. The waveform appearing at the collector of transistor 101 then is a pulse going from −20 volts to approximately 0 volt and back again to −20 volts. This pulse waveform appears at the switch side of the switch $S_1$ side of capacitor 104 as a positive pulse. It should be pointed out the only time there is a pulse produced at the capacitor 104 is at the time a negative pulse is applied to transistor 101 and the base bias applied thereto from channel B through resistor 134 coupled between terminal 98 and the base is at a value of +4 volts. If the voltage at terminal 98 is +14 volts, the negative pulse applied to the base of transistor 101 would not overcome the bias and would not be sufficient to turn transistor 101 on. Therefore, it is only when the transducer shaft 36 rotates past 7.2°, 14.4°, etc. in the clockwise direction that the required condition exists so that transistor 101 will be rendered conductive and produce a pulse at the switch $S_1$.

Considering the signal flow through transistors 102 and 103, a pulse appears at the output of capacitor 106, only when the transducer shaft 36 rotates past 7.2° or some multiple of 7.2° in the counterclockwise direction. When the transducer shaft rotates past one of the 7.2° increments in the counterclockwise direction, the channel A output at terminal 90 in FIGURE 2 goes from +4 to +14 volts and produces a positive going pulse at capacitor 136 shown in FIGURE 4 with the positive going pulse being applied to the base of transistor 102. This turns transistor 102 "off" and produces a negative pulse at the output of capacitor 138 which is coupled to the base of transistor 103 through resistor 139. This negative pulse overcomes the +4 volt reverse bias supplied to the base of transistor 103 by means of the voltage appearing at terminal 98 and applied thereto by means of resistor 135. Transistor 103 turns "on" and produces a positive pulse at the switch side of capacitor 106. The only time a pulse will appear at capacitor 106 is when a positive pulse supplied to the base of transistor 102 and the base of transistor 103 is at +4 volts. This condition can only occur when the transducer shaft rotates past one of the 7.2° increments in the counterclockwise direction.

In summation, then, as long as the transducer shaft 36 is rotating in a clockwise direction, positive pulses will be applied to the monostable multivibrator 108 every 7.2° of rotation whereas for a counterclockwise direction, monostable multivibrator 118 will receive positive pulses every 7.2° of rotation. Also for each 7.2° of rotation either in a clockwise or counterclockwise direction, negative pulses will appear at either circuit lead 116 or circuit lead 120, respectively, which will step the step motor 46 in the required clockwise or counterclockwise step for each pulse applied.

The negative pulses which appear on circuit lead 116 correspond to channel A and likewise the pulses appearing on circuit lead 120 for channel B are applied to the input terminals 137 and 141 of the record apparatus 42. These pulses are respectively applied to the record amplifier 122 and then to separate tracks of a four-track recording head 126 in the form of an 8 kilocycle per second (kc.) pulse from an oscillator, not shown, but triggered in accordance with the positive pulses received from the logic circuit 40 and applied respectively to terminals 137 and 141.

In addition to the 8 kc. pulses, two other signals are applied to the other two tracks. The first of these is a "cue" signal comprising a 150 cycle sinewave which is activated when switch S₃ is closed. This occurs whenever the operator pulls down on the hand crank 22 shown in FIGURE 1 and activates the clutch solenoid 64. This "cue" signal is used to activate the solenoid 64 in the "playback" mode of operation. Each time the operator pulls down on the hand crank, the 150 cycle sinewave from an oscillator in the record amplifier 122 is applied to one of the tracks. The section of the switch S₃ which activates the 150 cycle sinewave oscillator is the switch section which is coupled to a −22 volt supply, not shown. The fourth track of the four-track record head 126 receives a 1 kc. burst from an oscillator within the record amplifier 122 for stopping the tape loop at one end of one complete pass. Four signals then are recorded on the tape 130: first and second pulses for driving the step motor 46 either in a clockwise or counterclockwise direction; a 150 cycle "cue" signal; and the 1 kilocycle signal for stopping the tape loop.

The switch circuit 94 shown in FIGURE 4 also includes transistors 140 and 142. These transistors prevent any undesired transients from stepping the step motor 46. The collector of transistor 140 is connected to the CW input terminal of the motor controller which is common to lead 116. The collector of transistor 142 is connected to the CCW input of the motor controller 44. The bases of transistors 140 and 142 are normally biased "on" from a −20 volt DC bias voltage applied to terminal 143. When this occurs, transistors 140 and 142 provide a very low impedance across the input terminals CW and CCW, respectively. This condition occurs when the clutch solenoid is inoperative due either to the fact that the operator is not turning the hand crank 22 or else in the playback mode the clutch solenoid 64 is not activated automatically. However, when the clutch solenoid 64 is activated, switch S₃ returns the bases of transistors 140 and 142 to ground rendering them non-conductive which in turn allows pulses for stepping the step motor 46 to be coupled to the respective input CW and CCW of the motor controller 44.

Also included in the switch circuit 94 are transistors 148 and 150 coupled together to the motor controller 44. Also shown is a relay K₁ which is adapted to be coupled to the main power switch, not shown, for the sewing mechanism 10. The transistor 150 is coupled to the ground return circuit of the motor controller 44 and it will provide the necessary ground potential when it is rendered conductive; however, in order for other spurious switching transients from stepping the step motor 46 through the motor controller 44, a time delay is provided by means of transistor 148, the resistor 152 and the capacitor 154. When power is initially applied to the relay K₁ through the main power switch, 28 volts is applied to the series RC charging circuit comprising resistor 152 and capacitor 154. As the capacitor 154 charges, transistor 148 will be rendered conductive depending upon the RC time constant of resistor 152 and capacitor 154. Transistor 150 is turned on when transistor 148 is rendered conductive. Transistors 148 and 150 and resistor 152 and capacitor 154 then provide the necessary time delay for providing a ground return to the motor controller 44.

The circuitry shown in FIGURE 4 has been explained with reference to the "record" mode wherein a skilled operator sews a predetermined design by means of the hand crank 22 shown in FIGURE 1 at which time, the angular transducer 38 produces pulses in channels A and B which are then sensed in the logic circuit 40 to determine the clockwise or counterclockwise direction and then simultaneously apply control signals to the motor controller 44 and the record amplifier 22. This motion is recorded on two tracks of a four-track tape recording. Once the recording has been made, it is possible to switch into a playback mode and reproduce the design sewn without the need for operator control.

The playback mode simply requires the recorder 42 to be switched to playback and switch S₁ shown in the logic circuit 40 must be switched to its other position. Transistor 144 is included in the switch circuit 94 and has for its purpose activating the clutch solenoid 64 by means of the semiconductor switch 146 when the subject apparatus is in the playback mode. When playback of the tape 130 is initiated, the 150 cycle sinewave recorded on one track is fed to transistor 144 which activates the semiconductor switch 146 to apply 110 volts AC across the clutch solenoid. When this action occurs, the step motor controller is in a condition for stepping the step motor 46 in either a clockwise or counterclockwise direction. As playback of the tape proceeds, the recorded pulses from channels A and B appear on circuit leads 156 and 158, respectively, and are fed to the monostable multivibrators 108 and 118. These multivibrators then feed the proper pulses to the motor controller 44 for stepping the step motor 46 in response to the recorded information. The record amplifier 122 meanwhile is non-operative.

Once a skilled operator has made a recorded design, the playback equipment can be coupled to any desired number of sewing mechanisms equipped as shown and described with respect to the subject invention. Also, separate playback equipment could be used wherein a plurality of recorded designs could be made from a master and selectively utilized depending on the needs of the manufacturer.

We claim:

1. The method of operating an embroidery sewing machine having workpiece orientation and feed means adapted to be controlled by information received from a recording medium, comprising the steps of: moving the workpiece orientation and feed means on an embroidery sewing machine and recording the motions of said workpiece orientation and feed means on a recording medium as an operator sews a selected pattern, design or figure; and playing back the information recorded on the recording medium into the workpiece orientation and feed means on said embroidery sewing machine to control the operation of said embroidery sewing machine to automatically reproduce said selected pattern, design or figure.

2. The method of operating an embroidery sewing machine having means for hand operation thereof comprising the steps of: operating said means by hand on an embroidery sewing machine and recording the motions of said means for hand operation on a recording medium as an operator sews a selected pattern, design or figure; and playing back the recorded information on said medium into said means for hand operation on said embroidery sewing machine to control the operation of said machine and thereby automatically reproducing said selected pattern, design or figure.

3. The method of operating an embroidery sewing machine having hand operated means to control the direction of feed of the article being sewn, said method comprising the steps of: rotating said hand operated means on an embroidery sewing machine to establish a direction of feeding of the article being sewn so as to sew a predetermined design or pattern with the sewing machine, and recording the rotation of the hand operated means on a recording medium to produce a recorded program of said predetermined design or pattern.

4. The method as defined in claim 3 and including the additional step of automatically operating an embroidery sewing machine under control of said recorded program to reproduce said predetermined design or pattern.

5. A system for controlling the operation of an embroidery sewing mechanism comprising in combination: an embroidery sewing mechanism having a workpiece feed means; means coupled to said feed means for actuating said feed means to effect a predetermined sewing configuration on said workpiece in accordance with operator control of said means; transducer means coupled to said means coupled to said feed means for providing an electrical output in response to said actuation; and recorder means selectively coupled to said transducer means, being responsive to said electrical output for simultaneously making a recorded program of said sewn configuration.

6. The apparatus as defined in claim 5 and additionally including playback means selectively coupled to said means coupled to said feed means for selectively playing back said recorded program to automatically actuate said feed means to reproduce said sewn configuration on said sewing mechanism.

7. The invention as defined by claim 6, wherein said playback means comprises magnetic tape playback apparatus.

8. The apparatus as defined by claim 5 wherein said means coupled to said feed means includes a hand crank coupled to said transducer means comprising an angular transducer, wherein said angular transducer provides an electrical output signal indicative of the rotation of said hand crank.

9. The apparatus as defined in claim 5 wherein said means coupled to said feed means includes an electrical step motor coupled to said feed means for stepping said feed means in a clockwise and counterclockwise direction one step at a time in accordance with the actuation of said means by an operator.

10. The apparatus as defined by claim 5 wherein said transducer means comprises: a rotating disc coupled to said means coupled to said feed means and having a plurality of openings therein; light means located on one side of said rotating disc; a first and second photoelectric means located on the opposite side of said disc and being responsive to said light means; waveform generator means coupled to one of said photoelectric means providing a first channel output signal and a second waveform generator means coupled to the other of said photoelectric means for providing a second channel output signal.

11. The apparatus as defined by claim 5 wherein said transducer means comprises an angular transducer and wherein said means coupled to said feed means includes an electrical step motor and a hand crank adapted to be rotated by means of an operator for sewing a desired configuration, and additionally including means coupling said hand crank to said angular transducer for producing a pair of output signals indicative of the rotation of said hand crank, logic circuit means coupled to said angular transducer being responsive to said pair of output signals for providing a control signal indicative of said output of said angular transducer, circuit means coupling said recorder means to said logic circuit means, and means coupling said step motor to said logic circuit means, being responsive to said control signal therefrom for stepping said feed means in a clockwise or counterclockwise direction as provided by said hand crank.

12. The apparatus as defined by claim 11 wherein said angular transducer includes electrical circuit means for producing a first and a second electrical output signal having a first phase relationship for a clockwise rotation and a second phase shift relationship for a counterclockwise rotation, said logic circuit means being responsive to sad first and said second output signal from said angular transducer and including electrical circuit means for producing a first control signal for clockwise rotation and a second control signal for counterclockwise rotation, said step motor means responsive to said first and said second control signal from said logic circuit means for stepping said feed means clockwise and counterclockwise in accordance therewith.

13. The apparatus as defined by claim 5 wherein said recorder means comprises a tape recorder including a magnetic tape for making a recorded program of said sewn configuration.

References Cited

UNITED STATES PATENTS

| | | | |
|---|---|---|---|
| 3,072,081 | 1/1963 | Milligan et al. | 112—204 XR |
| 3,080,836 | 3/1963 | Clemens et al. | |
| 3,139,051 | 6/1964 | Story | 112—102 XR |
| 3,172,598 | 3/1965 | Carson et al. | 112—84 XR |
| 3,329,109 | 7/1967 | Portnoff et al. | |

JAMES R. BOLER, Primary Examiner

U.S. Cl. X.R.

112—102, 262